A. F. CASE.
CAR BLOCKING FOR CAR DUMPER CRADLES.
APPLICATION FILED MAR. 19, 1919.
1,427,090.
Patented Aug. 29, 1922.
2 SHEETS—SHEET 2.
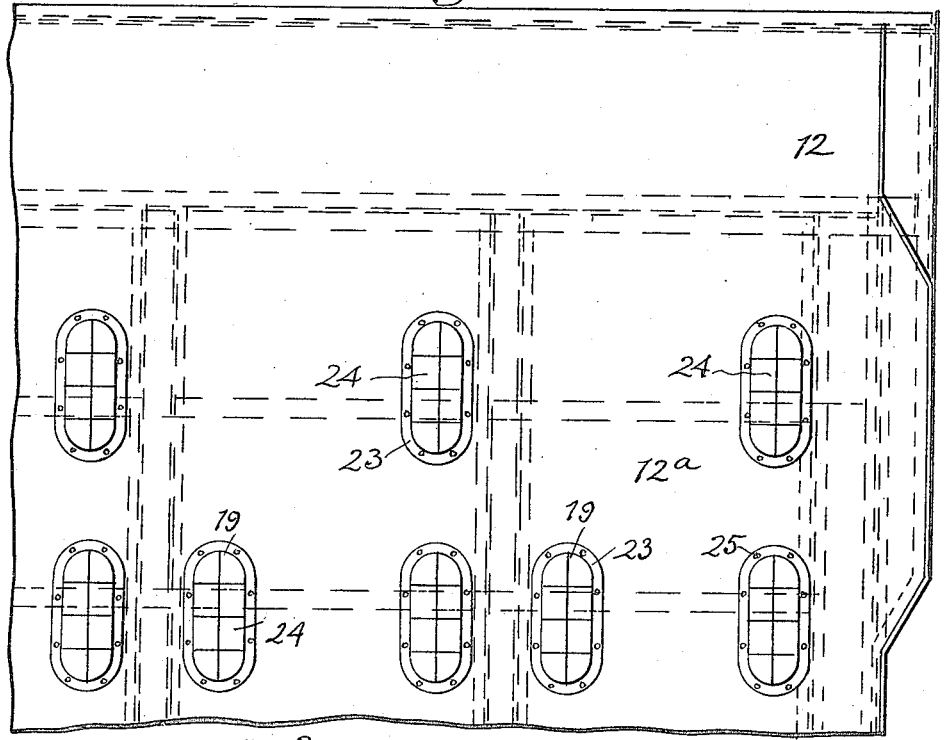
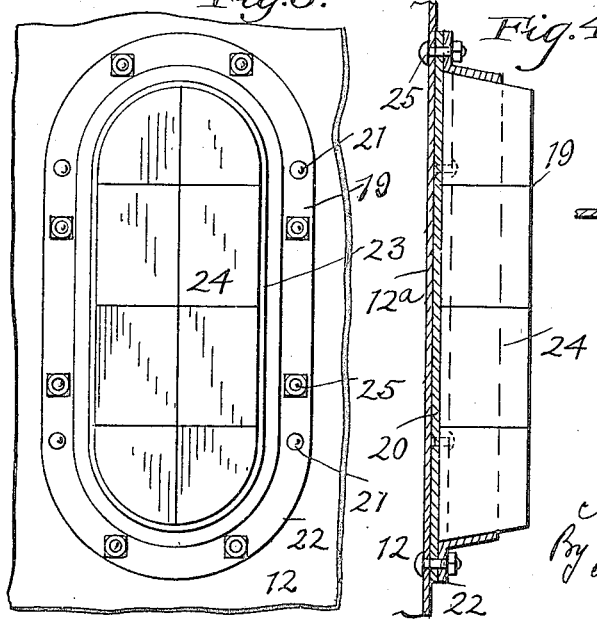
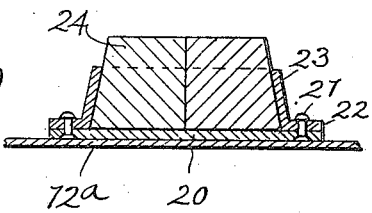

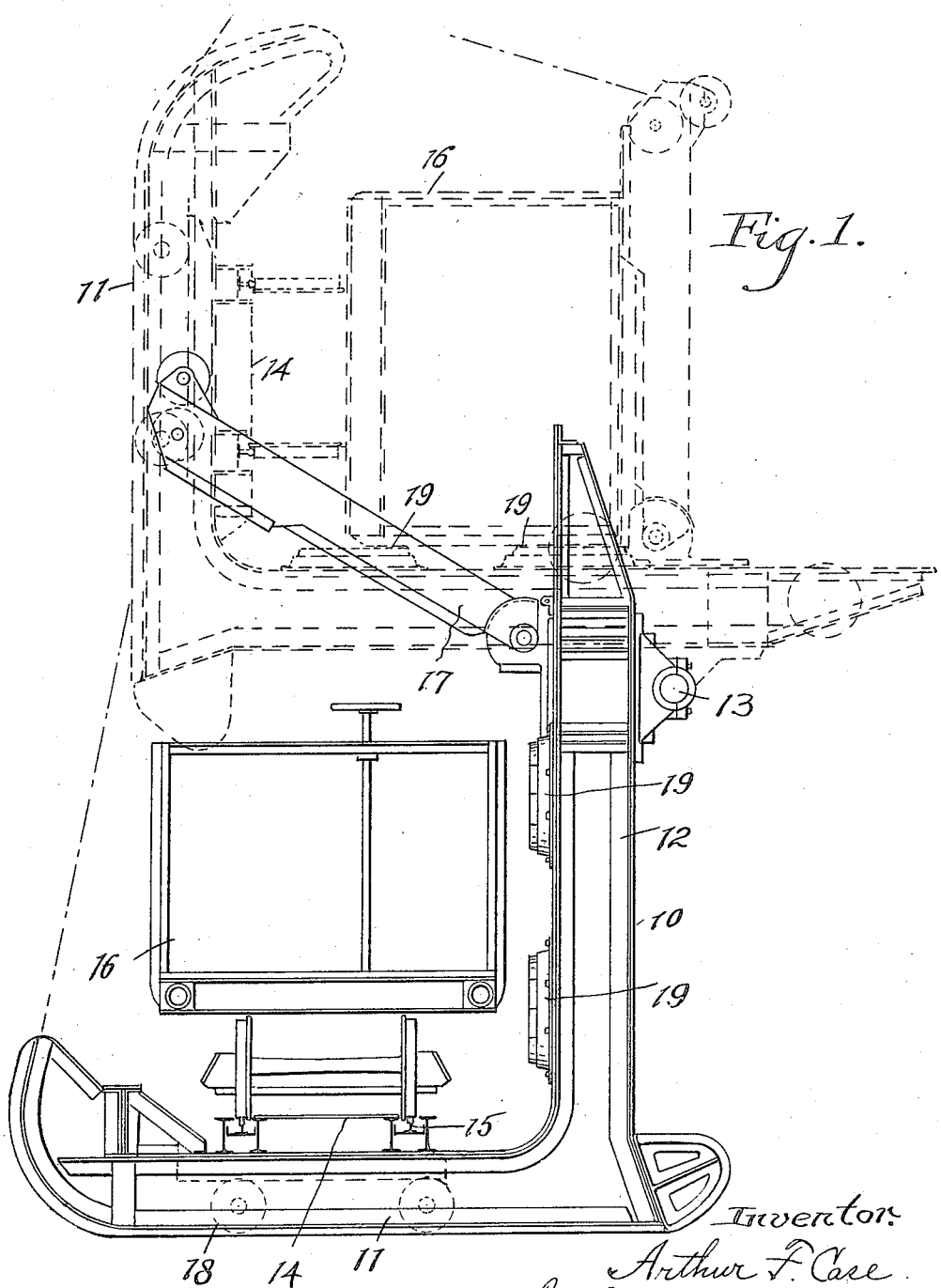

UNITED STATES PATENT OFFICE.

ARTHUR F. CASE, OF CLEVELAND, OHIO, ASSIGNOR TO THE WELLMAN-SEAVER-MORGAN COMPANY, OF CLEVELAND, OHIO, A CORPORATION OF OHIO.

CAR BLOCKING FOR CAR-DUMPER CRADLES.

1,427,090.     Specification of Letters Patent.    Patented Aug. 29, 1922.

Application filed March 19, 1919. Serial No. 283,631.

*To all whom it may concern:*

Be it known that I, ARTHUR F. CASE, a citizen of the United States, residing at Cleveland, in the county of Cuyahoga and State of Ohio, have invented a certain new and useful Improvement in Car Blockings for Car-Dumper Cradles, of which the following is a full, clear, and exact description.

This invention relates to a car blocking for the cradles of car dumpers.

A car dumper of the type with which my invention has particular utility includes a cradle onto which the cars run, and adapted to be tilted or first elevated and then tilted to cause a car to be turned sidewise and the contents to be dumped over the side thereof.

The cradle of a car dumper of this type is generally substantially L-shaped in cross section, being provided with a base or bottom portion having a laterally movable platen onto which the loaded car is designed to be run and being provided with what is normally an upright side portion. This platen is moved laterally toward the side of the cradle when the cradle starts to move, until the side of the car bears against the side of the cradle so that the latter will support the car while the material is being discharged therefrom, car clamps being provided to engage over the top of the car to hold the car down onto the platen during the dumping operation.

The object of this invention is to provide a so-called blocking designed to be secured to the previously mentioned upright side portion of the cradle to take the thrust of the car and to prevent damage to the car or cradle when the former is moved up against the side of the latter or while it is being supported by the same during the dumping operation. More particularly the invention aims to provide a blocking consisting of suitably spaced blocking or thrust receiving units detachably secured to the side of the cradle so that they will not only perform the desired function in the way of taking the thrust and load of the car but may be readily removed and replaced with new units when damaged, thus eliminating the necessity of keeping the dumper idle through a protracted period of repairing.

The above and other more specific or minor objects are attained by my invention which may be briefly summarized as consisting in certain novel details of construction and combinations and arrangements of parts which will be described in the specification and set forth in the appended claims.

In the accompanying sheets of drawings, Fig. 1 is an end view of the cradle of a dumper to which my invention is applied, the cradle being shown in full lines in the normal position with a car supported or run onto the platen, and being shown by dotted lines in a position 90° from the full line position; Fig. 2 is a fragmentary inside view of the side of the cradle, a portion of the length of the cradle only being shown; Fig. 3 is a face view of one of the blocking units showing the manner in which it is applied to the side of the cradle; Fig. 4 is a longitudinal sectional view through the same; and Fig. 5 is a transverse sectional view through the same.

In the drawings I have not shown the tower or supporting frame in which the cradle is mounted, for dumpers of the type to which my invention pertains are well known, and an illustration of the tower or frame which does not immediately concern my invention is not necessary for an understanding of the invention. The cradle of the dumper which I have shown at 10, is, as before stated, substantially L-shaped in cross section as it is provided with a normally horizontal base or bottom portion 11, and what is normally an upright or vertical side portion 12. In some dumpers when the contents of the cars must be discharged at a considerable height, this cradle is first elevated and then tilted, but in other dumpers it is given a rotary or tilting movement only. My invention is, of course, applicable to both types, but the cradle herein illustrated is designed to be tilted or rotated only, about an axis 13.

The bottom portion 11 of the cradle has a so-called platen 14 with track rails 15 onto which it is designed to be run a loaded car such as is illustrated at 16, which car is designed to be held down onto the platen by the usual car clamps 17, common in this art. The platen is supported on a series of rollers 18 so after the car is run thereon and the cradle starts to tilt or rise in the tower, the platen and car may be moved laterally toward the upright side portion 12 of the cradle, until the car rests against the latter so that it may be held rigid against the same while the cradle is being tilted.

To take the thrust and load of the car I provide on the inner face of the upright side 12 of the cradle, a blocking consisting of a number of units 19 which are spaced over the side of the cradle where needed, substantially as illustrated in Fig. 2. These separate units are secured to the side of the cradle in such a manner that they can be readily detached for repairs or replacement when any of them are injured, as will subsequently appear.

Each blocking unit includes a base plate 20 to which is secured by rivets 21 or equivalent means, a frame or holder having a laterally extending flange 22 which is secured to the base plate, and having an inwardly tapered outstanding flange 23 in which are held a series of blocks or pieces 24 of tough but yet yieldable material such as hard wood. That these blocks may be durable they are so prepared and mounted in the holder that the line of the graining is at right angles to the side of the dumper. These units 19 are separately secured to the front side or plate 12ª of the upright side of the cradle by means of bolts 25 which pass through the lateral flange 22 of the holder, and the marginal portion of the base plate 20.

With these units distributed over the inner face of the side of the cradle, the thrust and load of the car are taken with minimum damage to the car and cradle just as effectively as if the entire inner face of the side were lined with wood, and should any of the units be damaged, they can be quickly removed by simply unbolting the units and replacing them with new units. Generally when a car dumper installation embodying my invention is made, extra blocking units are furnished so that the replacement can be made conveniently and quickly, in consequence of which it is not necessary to keep the dumper idle for a long period, as would otherwise be the case.

When coal and the like is dumped from the car by tilting the cradle, it is always the case that some of the material falls down between the side of the car and the adjacent side of the cradle, and in designing the blocking units I have taken this into consideration, and have, by making the units oval shaped, as shown in the drawings, so that their ends are rounded, avoided the formation of shoulders or pockets which would prevent the coal or other material which fell between the car and the side of the cradle, sliding off the cradle when the cradle is tilted to its extreme position. Otherwise, considerable material would be retained on the cradle, and this would render its operation unsatisfactory.

Obviously the same result in the way of elimination of shoulders or pockets for the purpose stated, would be obtained by forming the lower ends of the blocking units in the shape of a V, but the present construction wherein both ends are made rounded is preferred since with this shape and with both ends symmetrical, the wood blocks can be easily given the proper shape and fitted into the holders.

While I have shown the preferred construction, I do not wish to be confined to the exact details shown, but aim in my claims to cover all modifications which do not involve a departure from the spirit and scope of my invention in its broadest aspects.

Having described my invention, I claim:

1. In a car dumper, a tilting cradle adapted to be turned about an axis to dump the contents of a car, and comprising a bottom portion on which the car is adapted to be run, and an upright side portion which supports the car during a portion of the tilting movement, the side of the cradle having a plurality of detachable car-blocking units spaced over the face of the same, each unit comprising an oval-shaped frame secured to the cradle and containing yieldable thrust-resisting material.

2. In a car dumper, a tilting cradle adapted to be turned about an axis to dump the contents of a car, and comprising a bottom portion having a laterally movable platen on which the car is adapted to be run, and an upright side portion which supports the car during a portion of the tilting movement, the side of the cradle having a plurality of spaced car-blocking units detachably secured to the inner face of the same, each unit comprising a plate having an outstanding retaining flange holding a plurality of thrust blocks.

3. In a car dumper, a tilting cradle adapted to be turned about an axis to dump the contents of a car, and comprising a bottom portion on which the car is adapted to be run, and an upright side portion which supports the car during a portion of the tilting movement, the side of the cradle having on its inner face a plurality of spaced car-blocking units, each unit being detachably secured in place and comprising a base plate, a frame having a flanged base secured to the base plate and an outstanding flange, and a plurality of tough yieldable blocks held by said second flange.

4. In a car dumper, a tilting cradle adapted to be turned about an axis to dump the contents of a car, and comprising a bottom portion on which the car is adapted to be run, and an upright side portion which supports the car during a portion of the tilting movement, the side of the cradle having on its inner face a plurality of spaced car blocking units, each unit comprising a base plate secured to the upright side portion of the cradle, and a holder secured to the base plate and containing thrust resisting material.

In testimony whereof, I hereunto affix my signature.

ARTHUR F. CASE.